United States Patent [19]

Rainey

[11] Patent Number: 5,277,844
[45] Date of Patent: Jan. 11, 1994

[54] RESISTOR COMPOSITION

[76] Inventor: Clifford S. Rainey, 308 Township Line Road, Blue Bell, Pa. 19422

[21] Appl. No.: 38,802

[22] Filed: Mar. 29, 1993

[51] Int. Cl.⁵ .......................... H01B 1/00; H01B 1/02; H01B 1/06; H01B 1/08
[52] U.S. Cl. ..................................... 252/518; 252/512; 252/514; 252/521; 106/1.24; 106/1.28; 502/62
[58] Field of Search ............... 252/514, 518, 521, 512; 106/1.24, 1.28; 502/62

[56] References Cited

U.S. PATENT DOCUMENTS

| | | | |
|---|---|---|---|
| 4,160,227 | 7/1979 | Ikegami et al. | 252/514 |
| 4,312,770 | 1/1982 | Yu et al. | 252/514 |
| 4,603,007 | 7/1986 | Shibata et al. | 252/514 |
| 5,162,062 | 11/1992 | Carroll et al. | 148/24 |

Primary Examiner—Paul Lieberman
Assistant Examiner—M. Kopec

[57] ABSTRACT

Low ohm $RuO_2$-based resistors are positively adjusted to 0 HTCR, without increasing resistance, using modified zeolite components of FCC catalyst. The non-metallic 0.2-8.0 wt % additions do not adversely affect past rheology or the physical properties of the resistors.

1 Claim, No Drawings

RESISTOR COMPOSITION

FIELD OF INVENTION

The invention is directed to low ohm thick film resistor compositions.

BACKGROUND OF THE INVENTION

The term resistor is used for devices made from materials which control electrical conductivity. In industrial and consumer applications, it is desirable that this control be invariant with respect to temperature, i.e. the temperature coefficient of resistance (TCR) be as close to zero as possible.

Currently, thick film 100–1M Ω[ ] resistors meet specified TCR values of less than ±100 ppm/°C., but 1–10 Ω/[ ] resistors have unacceptably large negative TCR values.

SUMMARY OF THE INVENTION

The invention in its primary aspect is directed to thick film low ohm resistors based on $RuO_2$ compositions which produce fired resistors which have essentially zero HTCR values. In particular, the invention is directed to a thick film composition comprising an admixture of micron to submicron particles of (a) 5–50% wt. of $RuO_2$, (b) 2–20% wt. of Ag, Pd, or mixtures thereof, (c) 80–20% wt. of glass or mixture of glasses containing by mole & basis total glass, (1) 60–85% glass-forming oxides containing 5–55% $B_2O_3$, 10–60% $SiO_2$, and 0–40% other glass-forming oxides selected from $Al_2O_3$, MgO, CaO, PbO, and mixtures thereof, and (2) 0–10% glass-modifying oxides consisting essentially of $Nb_2O_5$, MnO and mixtures thereof, (d) 0–20% wt. of a fluidized catalytic cracking (FCC) catalyst. Preferred is a stabilized Y zeolite exchanged with 0–20% wt. La, Ce, Pr, Nd, Eu or mixtures thereof, all of the components (a), (b), (c), (d), being dispersed in (e) an organic vehicle.

DESCRIPTION OF THE INVENTION

This invention is directed to resistors in which the principal conductive phase is a mixture of $RuO_2$, precious metals, and carbonized residuals.

A. $RuO_2$ Phase

It is preferred that $RuO_2$ (5–50 % wt.) be a finely divided powder and have an average surface area over 5 $m^2/g$.

B. Precious Metals

The precious metal (0–10% wt.) used in this invention may be finely divided Ag, Pd, Pt powders or mixtures thereof.

C. Carbonized Residuals

The carbonized residuals (0–5% wt.) remain in the fired composite after oxygenated functional groups are released ($CO_2$, $H_2O$) and aliphatic CH groups are removed from the vehicle.

The particle sizes of the above mentioned phases are not critical or entirely independent of their technical effectiveness in the invention. The should be of a size appropriate to screen printing and firing conditions. Thus all particles should be less than 10 microns, and in practice can be as small as 100 nm (0.1 micron).

C. Inorganic Binder

The composition of inorganic binders are given in mole percentages unless expressly indicated otherwise. The inorganic binder component of the invention is a lead borosilicate glass which when fired at 700°–1000° C. exhibits a viscosity of 1 to 1000 pascal-sec.

Coimpositionally, the glasses for use in the invention are 65–85% glass-forming oxdies and 40–10% glass-modifying oxides. The primary glass-forming oxides are $SiO_2$ (10–60%), PbO (10–40%), $B_2O_3$ (10–25%), and conditional glass-forming oxides up to a concentration of 20%. These conditional glass-forming oxides include $Al_2O_3$, MnO, $Nb_2O_5$, and mixtures thereof.

The glass for use in the invention have important limits with respect to the TCE, devitrivication, viscosity, and the diffusion rates of charge carriers in the fired resistor. Accordingly, minor additions of first and second transition series elements (up to 10%) may be used to adjust TCR.

D. FCC Catalyst

Compositionally the FCC catalyst for use in this invention is $SiO_2$ (30–70%), $Al_2O_3$ (5–40%), $Na_2O$ (0–5%), REO (5–25%). More preferred are stabilized Y zeolite $SiO_2$ (30–70%), $Al_2O_3$ (5–40%), $La_2O_3$ (0–25%), $CeO_2$ (0–25%), $Pr_6O_{11}$ (0–25%), $Nd_2O_3$ (0–25%).

The particles size, surface area, and pore size distribution of the above-described catalyst is not narrowly critical from the standpoint of their technical effectiveness in the invention. However, they should be appropriate to cracking requirements, screen printing, and firing conditions. It is preferred that particles be below 5 microns, over 20 $m^2/g$, and have a minimum diameter of the widest channel over 0.8 nm.

E. Vehicle

Various organic liquids, with or without thickening, stabilizing, setting, or rheological modifiers, may be used. A preferred vehicle is based on ethyl cellulose and various isoprenoid solvents.

FORMULATION AND APPLICATION

In the examples which follow, formulations of the present invention were prepared in the following manner:

The inorganic solid particulate are mixed by hand with the organic vehicle in an alumina crucible and dispersed with a three-roll mill to form a suspension, resulting in a composition for which the viscosity will be 100–200 pascal-seconds at a shear rate of 10 $sec^{-1}$.

The composition is then screen printed to a wet thickness of 30–60 microns on alumina substrates with already printed and fired conductive terminations (e.g. Du Pont QS170, 6160, 7484), using a 200–400 mesh screen and 0.2–0.12 mil thick emulsion pattern. The part is then dried at about 125° C. for about 15 minutes and resistors measured for thickness using a profilometer, prior to firing in a well ventilated belt furnace with a 15–20 minute temperature profile that will decompose the vehicle at 300°–500° C., a 10–15 minutes period for sintering at 700°–°900° C., followed by a cooldown cycle for 15–20 minutes.

MEASUREMENT OF RESISTANCE

Parts with eight resistors to be measured are mounted in a temperature controlled computer-automated cylindrical chamber and measured with a digital ohm-meter. The temperature is raised to 125° C. and allowed to equilibrate, after which the hot resistance of each resistor is measured and recorded. The chamber is then cooled by liquid nitrogen to −55° C. and cold resistances are measured and recorded. The chamber is then heated to 25° C. and resistances are measured.

The temperature coefficient resistance (TCR) is defined as:

$$TCR = \frac{R_T - R_{T0}}{R_{T0}} * \frac{1}{T - T_0} * 10^6$$

and referred to as HTCR when T=125° C., and CTCR when T=−55° C. The reference temperature $T_0$ is 25° C.

The resistance at 25° C. and HTCR for 1.0×1.0 mm resistors with dry thicknesses of 18–22 microns are normalized to 20 microns and reported as ohms per square and ppm/°C. respectively.,

EXAMPLES

In the Examples which follow, the compositions were prepared and resistors tested in the manner described hereinabove.

In Table I, the composition of three glasses in accordance with the invention are given.

TABLE I

Preferred Glass Compositions

| Composition | Glass No. 1 | 2 | 3 |
|---|---|---|---|
|  | (Mole %) | | |
| Glass Former | | | |
| SiO₂ | 50.0 | 58.1 | 27.2 |
| Al₂O₃ | 7.0 | 7.0 | 6.0 |
| PbO | 43.0 | 26.0 | 27.2 |
| B₂O₃ | — | — | 13.6 |
| Glass Modifier | | | |
| Nb₂O₅ | — | — | 3.5 |
| MnO | — | 8.0 | — |

EXAMPLES 1-4

TABLE II

Effect of Catalyst on Low Ohm Resistor Electrical Properties

| Composition | Example No. 1 | 2 | 3 | 4 |
|---|---|---|---|---|
|  | (wt %) | | | |
| Pd | 4.0 | 4.0 | 3.8 | 3.9 |
| Ag | 7.0 | 7.0 | 6.7 | 6.9 |
| RuO₂ | 29.5 | 29.5 | 28.2 | 29.0 |
| Y–ZC | — | 0.2 | 3.0 | 1.0 |
| Glass 1 | 3.5 | 3.5 | 3.4 | 12.3 |
| Glass 2 | 17.9 | 17.9 | 17.1 | 8.9 |
| Glass 3 | 8.1 | 8.1 | 7.8 | 8.0 |
| Vehicle | 30.0 | 30.0 | 30.0 | 30.0 |
| Electrical Properties (QS170) | | | | |
| R (ohms/▢) | 9.3 | 10.0 | 8.3 | 7.8 |
| HTCR (ppm/°C.) | −240 | −111 | −121 | 25 |

Examples 1–3 illustrate the effect of adding Y–ZC catalyst upon the electrical properties of a low ohm resistor. In particular, a tiny amount of Y–ZC dispersed into Example 1 results in the large positive shift in HTCR of Example 2. Example 3 formulated with 3.0 wt % catalyst shows a large positive shift in HTCR and lower R compared to Example 1.

Example 4 shows the effect of using a glass with less MnO, a well established negative TCR driver.

EXAMPLE 5-8

TABLE III

Catalyst Loading For Optimized Resistor Electrical Properties

| Composition | Example No. 5 | 6 | 7 | 8 |
|---|---|---|---|---|
|  | (wt %) | | | |
| Pd | 4.0 | 4.0 | 4.0 | 3.8 |
| Ag | 7.0 | 7.1 | 6.9 | 6.8 |
| RuO₂ | 29.3 | 29.2 | 28.8 | 27.7 |
| Y–ZC | 1.0 | 1.3 | 3.3 | 7.9 |
| Glass 1 | 12.4 | 12.3 | 12.1 | 11.8 |
| Glass 2 | 8.9 | 9.0 | 8.8 | 8.5 |
| Glass 3 | 8.1 | 8.2 | 8.0 | 7.8 |
| Vehicle | 29.2 | 28.9 | 28.1 | 25.7 |
| Electrical Properties (7484) | | | | |
| R (ohms/▢) | 9.5 | 9.2 | 10.9 | 11.9 |
| HTCR (ppm/°C.) | −1 | −4 | 38 | 63 |

A comparison of Example 5 with Example 4 shows that the choice of conductive terminations will moderately effect HTCR.

Examples 6–8 establish the amount of catalyst needed to produce a zero HTCR resistor. It shows that as the amount of catalyst is increased, the HTCR increases, and that the catalyst is a positive TCR driver.

It is further noted that as the amount of catalyst is increased, the resistance is slightly increased as well.

I claim:

1. A thick film resistor composition consisting essential of an admixture of micron to submicron particles of (a) 5–50% wt. of RuO₂, (b) 2–20% wt. of Ag, Pd, or mixtures thereof, (c) 80–20% wt. of glass or mixture of glasses containing by mole % basis total glass, (1) 60–85% glass-forming oxides containing 5–55% B₂O₃, 10–60% SiO, and 0–40% other glass-forming oxides selected from Al₂O₃, MgO, CaO, PbO, and mixtures thereof, and (2) 0–10% glass-modifying oxides consisting essentially of Nb₂O₅, MnO and mixtures thereof, (d) 0–20% wt. of a fluidized catalytic cracking (FCC) catalyst consisting of stabilized Y zeolite, exchanged with about 0.2–20% wt. La, Ce, Pr, Nd, Eu or mixtures thereof, all of the components (a), (b), (c), (d), being dispersed in (e) an organic vehicle.

* * * * *